(12) United States Patent
Bordelais et al.

(10) Patent No.: US 12,552,378 B2
(45) Date of Patent: Feb. 17, 2026

(54) METHOD FOR DETERMINING A SPEED PROFILE OF A MOTOR VEHICLE WITH NON-PREDETERMINED ACCELERATION

(71) Applicants: Renault s.a.s., Boulogne-Billancourt (FR); NISSAN Motor Co., Ltd., Yokohama (JP)

(72) Inventors: Francois Bordelais, Nanterre (FR); Vakanga Fadiga, St Cloud (FR); Maud Peyret, Paris (FR)

(73) Assignees: Ampere s.a.s., Boulogne-Billancourt (FR); NISSAN Motor Co., Ltd., Yokohama (JP)

( * ) Notice: Subject to any disclaimer, the term of this patent is extended or adjusted under 35 U.S.C. 154(b) by 344 days.

(21) Appl. No.: 17/782,017

(22) PCT Filed: Nov. 30, 2020

(86) PCT No.: PCT/EP2020/083884
§ 371 (c)(1),
(2) Date: Jun. 2, 2022

(87) PCT Pub. No.: WO2021/121924
PCT Pub. Date: Jun. 24, 2021

(65) Prior Publication Data
US 2023/0018073 A1 Jan. 19, 2023

(30) Foreign Application Priority Data
Dec. 16, 2019 (FR) ...................................... 1914455

(51) Int. Cl.
*B60W 30/14* (2006.01)
(52) U.S. Cl.
CPC ....... *B60W 30/146* (2013.01); *B60W 2520/00* (2013.01); *B60W 2552/00* (2020.02); *B60W 2555/00* (2020.02)

(58) Field of Classification Search
None
See application file for complete search history.

(56) References Cited

U.S. PATENT DOCUMENTS 9,932,038 B1 4/2018 Zhu et al.
2010/0256856 A1* 10/2010 Taguchi .......... B60W 30/18127
903/903
(Continued)

FOREIGN PATENT DOCUMENTS

CN 108099908 B * 7/2019 ............ B60W 50/00
DE 10 2012 213 321 A1 1/2014
(Continued)

OTHER PUBLICATIONS

English Translation of Chinese Published Application CN 108099908 B. (Year: 2024).*
(Continued)

*Primary Examiner* — Maceeh Anwari
*Assistant Examiner* — Charles Pall
(74) *Attorney, Agent, or Firm* — Oblon, McClelland, Maier & Neustadt, L.L.P.

(57) ABSTRACT

A method for determining a speed profile to be followed by a vehicle, including acquiring event data including a distance from an event and a target speed at this event for the vehicle, and determining a speed profile to be followed as a function of time, between an initial speed and the target speed in three successive distinct phases, respectively a first phase in which the jerk is set constant at a predetermined maximum jerk value to reach an optimal target acceleration value, a second phase in which the optimal target acceleration value is kept constant, and a third phase in which the jerk is again set constant to reach a zero acceleration value at the end of the third phase. The optimal target acceleration
(Continued)

value is such that the distance required to carry out the three phases of the profile is equal to the distance from the event.

13 Claims, 4 Drawing Sheets

(56) References Cited

U.S. PATENT DOCUMENTS

| | | | |
|---|---|---|---|
| 2012/0130612 A1* | 5/2012 | Watanabe | B60T 8/17554 |
| | | | 701/70 |
| 2012/0277965 A1 | 11/2012 | Takahashi et al. | |
| 2015/0298699 A1 | 10/2015 | Poechmueller et al. | |
| 2017/0039855 A1 | 2/2017 | Maeda et al. | |
| 2017/0072955 A1 | 3/2017 | Ediger et al. | |
| 2017/0259795 A1* | 9/2017 | Das | B60W 30/17 |
| 2019/0324469 A1* | 10/2019 | Chen | G05D 1/0223 |

FOREIGN PATENT DOCUMENTS

| | | | | |
|---|---|---|---|---|
| DE | 102015221612 A1 * | 5/2017 | | B60W 50/0097 |
| EP | 3 127 770 A2 | 2/2017 | | |
| EP | 3 144 197 A1 | 3/2017 | | |
| WO | WO 2019/020354 A1 | 1/2019 | | |

OTHER PUBLICATIONS

"Calculate the constant acceleration needed for the discrete time trajectory to intersect a given target point", Stack Exchange Mathematics, Aug. 16, 2018, available at: https://math.stackexchange.com/questions/2879244/calculate-the-constant-acceleration-needed-for-the-discrete-time-trajectory-to-i (Year: 2018).*
English translate of Rathgeber—DE 102015221612 A1 (Year: 2017).*
International Search Report mailed Mar. 3, 2021 in PCT/EP2020/083884 filed on Nov. 30, 2020 (2 pages).
Preliminary French Search Report dated Sep. 11, 2020 in French Application 1914455 filed on Dec. 16, 2019 (2 pages).

* cited by examiner

METHOD FOR DETERMINING A SPEED PROFILE OF A MOTOR VEHICLE WITH NON-PREDETERMINED ACCELERATION

The present invention relates to the field of motor vehicles, and in particular to the field of systems and devices for assisting in the driving of such vehicles. It relates more particularly to a method for determining a speed profile to be followed by a motor vehicle.

Adaptive speed control systems for a motor vehicle (known by the acronym ACC for "adaptive cruise control") are known, which are designed to continuously control the speed of the "host" vehicle according to a longitudinal control law for the vehicle that is able to control the speed of the "host" vehicle according to a speed instruction requested by the driver and the presence of a vehicle in front in the same traffic lane, called a "target vehicle". This longitudinal control law may be used in various scenarios. Thus, the equipped vehicle may automatically modulate its speed so as to keep a predetermined safety distance with respect to the target vehicle. As soon as the lane is clear in front of the equipped vehicle, its acceleration increases automatically to reach the instruction speed selected by the driver, and thus assist the driver in their driving task. If a slower vehicle is detected in its lane in front of the equipped vehicle, the speed is then automatically modulated so as to adjust the safety distance. This control law may also simultaneously check comfort criteria (bounded accelerations, decelerations and jerk (i.e. the derivative of the acceleration)).

The control law therefore makes it possible to control a longitudinal speed of the vehicle in accordance with the speed instruction defined by the driver and, where applicable, to reduce this speed in the case of a target vehicle being detected in front of the host vehicle. Now, this control does not take into account, in order to anticipate decelerations and accelerations, contextual and semantic information that may be extracted from the road scene observed by a multi-sensor detection system fitted to the host vehicle, such as arriving at a STOP sign, approaching a roundabout, a bend, a traffic jam or a change in the speed limit, etc. Consequently, the behavior of the vehicle is not always adapted to its environment. However, taking contextual information into account is desirable in order to achieve more robust control systems, which are essential for autonomous driving.

Patent document US2019106108 describes a control law that determines a speed profile for a motor vehicle along a planned trajectory in response at least in part to (i) the detection of an object along the planned trajectory, (ii) the determination of a change in speed limit along the planned trajectory, and (iii) the selection of a speed by the user. The control law then makes it possible to manage the speed of the vehicle along the planned trajectory in accordance with the determined speed profile.

However, this publication remains very general in implementation. In particular, it is indicated that a speed profile based on an acceleration profile which is calculated differently depending on certain conditions is used, but it is not explained how this profile is calculated so as to ensure the comfort of the driver. Another problem posed is that of having sufficient data to allow the system to be calibrated.

More generally, another problem remains in the prior art, which is that of generating a speed profile to be followed by the speed controller which makes it possible to save energy over the journey.

To overcome the problems mentioned above, one subject of the invention is a method for determining a speed profile to be followed by a motor vehicle, the method comprising steps of acquiring contextual information on the road environment of the vehicle via a multi-sensor system of the vehicle, of extracting event data from the acquired contextual information, comprising at least one distance from an event in relation to said vehicle and a target speed for said vehicle at this event, of providing a measured initial speed of said vehicle, of determining a speed profile to be followed as a function of time, between said measured initial speed and said target speed in three successive distinct phases, respectively a first phase in which the jerk is set constant at a predetermined maximum jerk value in order to reach an optimal target acceleration value at the end of the first phase, a second phase in which said optimal target acceleration value is kept constant throughout the duration of the second phase and a third phase in which the jerk is again set constant in order to reach a zero acceleration value at the end of the third phase, said method comprising a step of determining said optimal target acceleration value during the second phase such that the distance required to carry out the three phases of said profile by applying said determined optimal target acceleration value is equal to said distance from the event.

Advantageously, the distance required to carry out the three phases of said profile is calculated from a set of equations implemented for the calculation of the speed profile, the calculation steps of which comprise, for a set of fixed parameters comprising the initial speed and the initial acceleration of the vehicle when starting the speed profile, the target speed at the event and the predetermined maximum jerk value, and for an unfixed parameter comprising the optimal target acceleration to be reached in the second phase of the profile:
- the calculation of the duration of the phases and start and end times delimiting the phases,
- the calculation of the passage speeds at the start and end times delimiting the second phase,
- the calculation of the speed as a function of time for each of the phases, and
- the calculation of the distances traveled at the start and end times delimiting the phases.

Advantageously, the determination of said optimal target acceleration value is carried out through iteration and bisection from a predetermined range bounded by a minimum acceleration value and a maximum acceleration value.

Advantageously, at each iteration, the distance required to produce the profile is calculated with an intermediate acceleration value, which is a barycenter of the two, minimum and maximum, acceleration values.

Advantageously, in said third phase, the jerk is set constant at said predetermined maximum jerk value of the first phase.

As a variant, in said third phase, the jerk is set constant at a predetermined maximum jerk value different from said predetermined maximum jerk value of the first phase.

Advantageously, said predetermined maximum jerk value is different depending on whether the speed profile relates to a positive acceleration or to a negative acceleration of the vehicle.

Advantageously, the method comprises a step of transmitting said speed profile as an instruction to an adaptive speed control system fitted to the vehicle.

The invention also relates to a device intended to be installed on board a vehicle for the implementation of the method as described above, characterized in that it comprises a multi-sensor system able to acquire contextual information on the road environment of the motor vehicle, a vehicle speed sensor, means for calculating said speed profile as a function of event data extracted from said acquired contextual information and control means for applying said calculated speed profile to a vehicle adaptive speed control system.

The invention also relates to a motor vehicle comprising a device as described above.

Other features and advantages of the invention will become clearly apparent from the description given below, by way of entirely non-limiting indication, with reference to the appended drawings, in which.

The invention applies to a motor vehicle equipped with an adaptive speed control system and a multi-sensor perception system which are able to deliver contextual information relating to the events in the road scene ahead of the vehicle, for example approaching a roundabout, a bend, a traffic jam, a change in speed limit, etc. The data collected by the on-board sensors are sent to an electronic computer, which, by virtue of an environmental perception algorithm analyzing these data, constructs a description of the near environment of the vehicle and a configuration of the road scene. From this environment, the system is able to provide a (distance, speed) pair relating to a detected event, comprising the distance from this event $D_{event}$ and the speed to be reached $V_3$ at this event, called the target speed. This detected event may, for example, be a speed limit sign.

The vehicle also comprises an on-board speed sensor, delivering information on its speed and its acceleration by processing the speed.

The speed profile described below is a speed profile determined from the measured speed of the vehicle and intended to be transmitted as an instruction to be followed to the adaptive speed control system of the vehicle so as to anticipate decelerations and accelerations when approaching an event. More specifically, the speed profile must allow the vehicle to go from its initial speed to the target speed while observing constraints in vehicle dynamics in terms of acceleration, which may be positive or negative (deceleration), depending on the type of profile, and jerk, i.e. the derivative of the acceleration. These last constraints will make it possible to optimize the performance in following this profile by the vehicle's adaptive speed control system.

Figure 1:
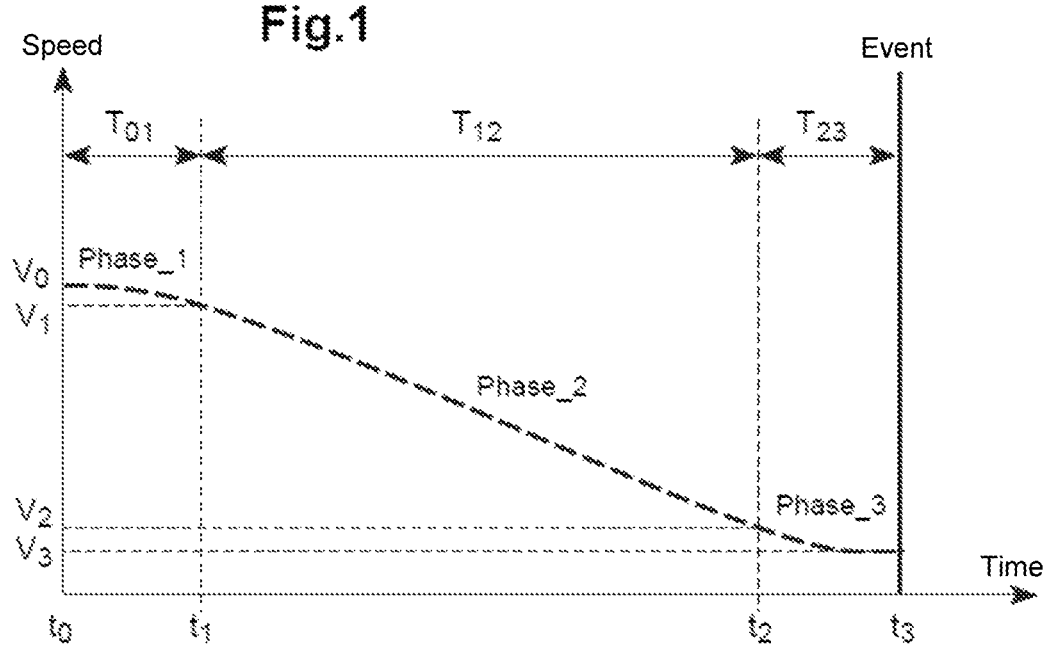
FIG. 1 is a graph illustrating an example of a speed profile according to the invention as a function of time, with acceleration dependent on the distance from an event, allowing the vehicle to go from its initial speed to a target speed to be reached at the event, in a case where the target speed is lower than the initial speed.

The principle of the speed profile of the invention will now be illustrated starting from an example of a decreasing profile, as illustrated in FIG. 1, taking as the starting assumption a zero initial acceleration and a constant initial vehicle speed, denoted $V_0$, and, as the ending assumption, a zero acceleration and a constant target vehicle speed $V_3$, with $V_3<V_0$, since the speed profile here is decreasing.

The speed profile presented in FIG. 1 is defined according to the invention in three successive phases:

a first phase, denoted Phase_1, extending between the start time $t_0$ and end times $t_1$ delimiting this phase, in which the jerk value is set at a predetermined maximum jerk value, of absolute value denoted $J_{maxi}$, in order to reach an optimal target acceleration value at time $t_1$, of absolute value denoted $A_{target}$, a second phase, denoted Phase_2, extending between the start time $t_1$ and end time $t_2$ delimiting this phase, in which the target acceleration value reached at $t_1$ is kept constant throughout the duration of the second phase, the jerk value then being zero, a third phase, denoted Phase_3, extending between the start time $t_2$ and end time $t_3$ delimiting this phase, in which the jerk value is again preferably set at the predetermined maximum jerk value $J_{maxi}$, in order to return to a zero acceleration value at time $t_3$.

The division of the speed profile according to the invention into three distinct successive phases is necessary in order to observe the constraints in vehicle dynamics in terms of jerk value in phases Phase_1 and Phase_3.

There is therefore the following set of fixed parameters:
$V_0$: the initial speed when starting the speed profile;
$V_3$: the target speed to be reached at the event;
$A_{init}$: the acceleration of the vehicle when starting the speed profile, which might not be zero;
$J_{maxi}$: the maximum jerk value defined for the profile.

The speed profile is expressed by two calculation functions actually used by the vehicle speed control system:

An instruction speed, $V_{profil}$, to be followed as a function of time (t):

$$V_{profil}(t)=f(t,V_0,V_3,A_{init},J_{maxi})$$

The distance required to achieve the speed profile, denoted $D_{profil}$.

Following of the profile will be triggered as soon as the distance from the targeted event that it is sought to anticipate, $D_{event}$, originating from the vehicle's multi-sensor perception system, becomes equal to $D_{profil}$, for a given set of parameters.

It is desired to start the profile when the distance from the event $D_{event}$ and the speed to be reached $V_3$ at the event are known, the following of the profile having to ensure a behavior adapted to the target speed desired at this event. For this type of profile, the acceleration to be used is not a constraint. This involves generating a speed profile with non-predetermined acceleration. It is therefore necessary to determine the acceleration before calculating the speed profile to be followed. The acceleration is determined by bisection.

The bisection method makes it possible to find an optimal target acceleration value $A_{target}$ such that:

$$\begin{cases} D_{profil}(V_0, V_3, J_{maxi}, A_{target}) = D_{event} \\ |A_{target}| \leq A_{maxi} \end{cases}$$

The calculation steps for calculating this distance required to achieve the speed profile $D_{profil}$ will be detailed below.

The durations of the phases and the start and end times $t_0$, $t_1$, $t_2$ and $t_3$ delimiting phases Phase_1, Phase_2 and Phase_3 as defined in FIG. 1 are calculated.

The passage speeds $V_1$ and $V_2$ corresponding to the respective passage speeds at the start and end times $t_1$ and $t_2$ delimiting the second phase Phase_2 are calculated.

The behavior of the speed as a function of time for each of phases Phase_1, Phase_2 and Phase_3 is calculated.

The distances traveled as a function of time at each of times $t_0$, $t_1$, $t_2$ and $t_3$ delimiting the different phases Phase_1, Phase_2 and Phase_3, denoted $X_0$, $X_1$, $X_2$ and $X_3$, respectively, are calculated. Thus, the distance required to achieve the profile is $D_{profil}=X_3$.

The results of these speed profile calculation steps are detailed below and will be demonstrated further on.

For the calculation of the start and end times $t_0$, $t_1$, $t_2$ and $t_3$ delimiting phases Phase_1, Phase_2 and Phase_3, the following notation is used:

$t_0=0$ (by assumption)

$t_1=T_{01}$ $t_2=T_{01}+T_{12}$ $t_3=T_{01}+T_{12}+T_{23}$

With $T_{01}$, $T_{12}$ and $T_{23}$ the respective durations of phases Phase_1, Phase_2 and Phase_3 by integrating the speed between the various points:

$$T_{01} = \frac{A_{target}}{J_{maxi}}$$

$$T_{12} = \frac{V_0 - V_3}{A_{target}} - \frac{A_{target}}{J_{maxi}}$$

$$T_{23} = \frac{A_{target}}{J_{maxi}}$$

Regarding the various passage speeds of the phases, i.e. the speeds at times $t_0$, $t_1$, $t_2$ and $t_3$, denoted $V_0$, $V_1$, $V_2$ and $V_3$, respectively, they are expressed as follows:

$V_0$, the initial speed of the profile, which is an imposed value, corresponding to the current measured speed of the vehicle when the profile is calculated, $$V_1 = V_0 - J_{maxi} \times \frac{T_{01}^2}{2}$$

$$V_2 = V_3 + \frac{T_{23}^2}{2} \times J_{maxi}$$

$V_3$ is the target speed that it is desired to reach by following the speed profile and is also imposed, like the initial speed.

The equation for the speed profile v(t) for each of the phases is determined as a function of the elapsed time, as follows:

Phase_1, for $0 \le t \le t_1$: $V(t) = V_0 - J_{maxi} \times \frac{t^2}{2}$

Phase_2, for $t_1 \le t \le t_2$: $V(t) = V_1 - A_{target} \times (t - t_1)$

Phase_3, for $t_2 <= t <= t_3$: $V(t) = V_3 + \frac{(t-t_3)^2}{2} \times J_{maxi}$ The distances traveled as a function of time are calculated as follows:

$X_0 = 0$ (by assumption)

$$X_1 = X_0 + T_{01} \times V_0 - \frac{T_{01}^3}{6} \times J_{maxi}$$

$$X_2 = X_1 + T_{12} \times V_1 - \frac{T_{12}^2}{2} \times A_{target}$$

$$X_3 = X_2 + T_{23} \times V_3 + \frac{T_{23}^3}{6} \times J_{maxi}$$

The distance required to achieve the profile is $D_{profil}=X_3$. Thus, when the distance from the event is equal to $X_3$, the following of the speed profile will be triggered by sending a speed instruction V(t) as defined above.

These results will now be demonstrated.

For phase Phase_1, for t such that $t_0 \le t \le t_1$:

The jerk $J_{01}(t)$ of the profile over this first phase is set constant and has a value of: $J_{01}(t)=-J_{maxi}$ Since the initial acceleration $A_{init}$ is zero, the acceleration as a function of time, denoted $A_{01}(t)$ in this first phase, has a value of:

$$A_{01}(t)=A_{init}+\int_0^t J(t)dt$$

$$A_{01}(t)=-J_{maxi} \times t$$

Then deduced therefrom is the change in the speed as a function of time, denoted $V_{01}(t)$ in this first phase:

$$V_{01}(t) = V_0 + \int_0^t A_{01}(t)dt$$

$$V_{01}(t) = V_0 - J_{maxi} \times \frac{t^2}{2}$$

Hence the distance traveled as a function of time $X_{01}(t)$ in the first phase Phase_1:

$$X_{01}(t) = X_0 + \int_0^t V_{01}(t)dt$$

$$X_{01}(t) = t \times V_0 - \frac{t^3}{6} \times J_{maxi}$$

For the second phase Phase_2, for t such that $t_1 \le t \le t_2$:

The acceleration as a function of time, denoted $A_{12}(t)$ in this second phase, is constant in this phase, namely:

$$A_{12}(t)=-A_{target}$$

Therefore deduced therefrom is the change in the speed as a function of time in this second phase, denoted $V_{12}(t)$:

$$V_{12}(t)=V_1+\int_{t_1}^t A_{12}(t)dt$$

$$V_{12}(t)=V_1-A_{target} \times (t-t_1)$$

Hence the distance traveled as a function of time $X_{12}(t)$ in this second phase:

$$X_{12}(t) = X_1 + \int_{t_1}^t V_{12}(t)dt$$

$$X_{12}(t) = X_1 + (t-t_1) \times V_1 - \frac{(t-t_1)^2}{2} \times A_{target}$$

Lastly, for the third phase Phase_3, for t such that $t_2 \leq t \leq t_3$:

The jerk $J_{23}(t)$ of the profile over this first phase is set constant and has a value of:

$$J_{23}(t) = J_{maxi}$$

Since the final acceleration in the third phase $A_{final}$ is zero, the acceleration as a function of time denoted $A_{23}(t)$ in this phase has a value of:

$$A_{23}(t) = A_{final} + \int_{t_3}^{t} J_{23}(t) dt$$

$$A_{23}(t) = (t - t_3) \times J_{maxi}$$

Then deduced therefrom is the change in the speed as a function of time in this third phase, denoted $V_{23}(t)$:

$$V_{23}(t) = V_3 + \int_{t_3}^{t} A_{23}(t) dt$$

$$V_{23}(t) = V_3 + \frac{(t - t_3)^2}{2} \times J_{maxi}$$

Hence the distance traveled as a function of time $X_{23}(t)$ in this phase:

$$X_{23}(t) = X_3 + \int_{t_3}^{t} V(t) dt$$

$$X_{23}(t) = X_3 + (t - t_3) \times V_3 + \frac{(t - t_3)^3}{6} \times J_{maxi}$$

For the expression of the respective durations of phases $T_{01}$, $T_{12}$ and $T_{23}$ and of the start and end times delimiting the phases, it is recalled that the following notation is used:

$t_0 = 0$ (by assumption)

$t_1 = T_{01}$ $t_2 = T_{01} + T_{12}$ $t_3 = T_{01} + T_{12} + T_{23}$

The duration $T_{01}$ of the first phase Phase_1 has a value of:

$$T_{01} = t_1 - t_0 = t_1$$

However, the acceleration is continuous between the first phase Phase_1 and the second phase Phase_2, i.e.:

$$A_{01}(t_1) = A_{12}(t_1)$$

Which is equivalent to:

$$-J_{maxi} \times t_1 = -A_{target}$$

$$\text{Hence:} T_{01} = t_1 = \frac{A_{target}}{J_{maxi}}$$

Thus, the speed $V_1$ reached at time $t_1$ (corresponding to the end of the first phase and to the start of the second phase) has a value of:

$$V_1 = V_{01}(t_1) = V_{01}(T_{01})$$

$$\text{Namely } V_1 = V_0 - J_{maxi} \times \frac{T_{01}^2}{2}$$

Now starting from the duration $T_{23}$ of the third phase Phase_3, it has a value of:

$$T_{23} = t_3 - t_2$$

However, as between the first phase and the second phase, the acceleration is continuous between the second phase Phase_2 and the third phase Phase_3, i.e.:

$$A_{23}(t_2) = A_{12}(t_2)$$

Which is equivalent to:

$$(t_2 - t_3) \times J_{maxi} = -T_{23} \times J_{maxi} = -A_{target}$$

$$\text{Hence:} T_{23} = \frac{A_{target}}{J_{maxi}}$$

Thus, the speed $V_2$ reached at time $t_2$ (corresponding to the end of the second phase and to the start of the third phase) has a value of:

$$V_2 = V_{23}(t_2) = V_{23}(T_{23})$$

$$\text{Hence:} V_2 = V_3 + J_{maxi} \times \frac{T_{23}^2}{2}$$

Now starting from the duration $T_{12}$ of the second phase Phase_2, it has a value of:

$$T_{12} = t_2 - t_1$$

However, the speed at time $t_2$ at the end of the second phase is denoted $V_2$ and may be written as follows:

$$V_{12}(t_2) = V_2$$

Which is equivalent to:

$$V_1 - A_{target} \times (t_2 - t_1) = V_1 - A_{target} \times T_{12} = V_2$$

$$\text{Thus:} T_{12} = \frac{V_1 - V_2}{A_{target}}$$

By replacing the expressions of $V_1$, $V_2$, $T_{01}$ and $T_{23}$ developed previously, the following is deduced therefrom:

$$T_{12} = \frac{V_0 - V_3}{A_{maxi}} - \frac{A_{target}}{J_{maxi}}$$

It is apparent from the demonstration of the results of the calculation of the speed profile that although it is defined in 3 phases as a function of time, its implementation remains straightforward because it requires only simple mathematical operations (additions, multiplications, divisions) and simple logical checks. The computing power required is therefore limited.

Reference is now made to a more general speed profile, i.e. one that may be increasing or decreasing, with an initial acceleration value that might not be zero.

The starting assumption used here is therefore that of an initial acceleration $A_{init}$ that might not be zero and a constant initial vehicle speed $V_0$ and, as the ending assumption, a zero acceleration and a constant target vehicle speed $V_3$, with $V_3 < V_0$ or $V_3 > V_0$, depending on whether the speed profile is decreasing or increasing.

Like for the previous example, the speed profile is always defined according to the invention by the following three successive phases:

the first phase Phase_1, where the jerk value is set to the maximum jerk value $J_{maxi}$, in order to reach the optimal The behavior of the speed as a function of time for each of phases Phase_1, Phase_2 and Phase_3 is calculated.

The distances traveled as a function of time at each of times $t_0$, $t_1$, $t_2$ and $t_3$ delimiting the different phases Phase_1, Phase_2 and Phase_3, denoted $X_0$, $X_1$, $X_2$ and $X_3$, respectively, are calculated.

The table below summarizes the change in the jerk, acceleration, speed and distance traveled variables in the various phases of the general speed profile:

TABLE 1

| | time | Phase_1 constant jerk | time | Phase_2 constant acceleration | time | Phase_3 constant jerk | time |
|---|---|---|---|---|---|---|---|
| Time t | $t_0 = 0$ | $t_0 \le t \le t_1$ | $t_1$ | $t_1 \le t \le t_2$ | $t_2$ | $t_2 \le t \le t_3$ | $t_3$ |
| Jerk J(t) | | $s_1 \times J_{maxi}$ | | 0 | | $s \times J_{maxi}$ | |
| Acceleration A(t) | $A_{init}$ | $A_{init} \to s \times A_{target}$ | $s \times A_{target}$ | $s \times A_{target}$ | $s \times A_{target}$ | $s \times A_{target} \to 0$ | 0 |
| Speed V(t) | $V_0$ | $V_0 \to V_1$ | $V_1$ | $V_1 \to V_2$ | $V_2$ | $V_2 \to V_3$ | $V_3$ |
| Distance traveled X(t) | $X_0 = 0$ | $X_0 \to X_1$ | $X_1$ | $X_1 \to X_2$ | $X_2$ | $X_2 \to X_3$ | $X_3$ | target acceleration value, dependent on the distance from the detected event, of absolute value denoted $A_{target}$, the second phase Phase_2, where the acceleration is kept at the optimal target acceleration value, the third phase, at the maximum jerk value in order to return to a zero acceleration value.

In the same way as above, the distance required to achieve the speed profile is denoted $D_{profil}$. Thus, the profile will be triggered when arriving at a distance $D_{profil}$ from the event.

Since the parameters $A_{init}$ and $J_{maxi}$ are absolute values, the following variables s and s1 are introduced to reflect the relative acceleration and jerk values.

The variable s is defined as follows:

$$s = \begin{cases} 1 & \text{if } V_3 > V_0 \\ -1 & \text{otherwise} \end{cases}$$

Thus, if the profile is increasing, i.e. $V_3 > V_0$, then s will have a value of 1 and if it is decreasing, s will have a value of −1. In addition, in the first phase Phase_1 of the speed profile, the acceleration will change from $A_{init}$ to $s \times A_{target}$, in the second phase Phase_2, it will be kept at $s \times A_{target}$, and in the third phase Phase_3, it will change from $s \times A_{target}$ to 0 m/s².

In addition, the variable $s_1$ is defined as follows:

$$s_1 = \begin{cases} 1 & \text{if } s \times A_{target} > A_{init} \\ -1 & \text{otherwise} \end{cases}$$

This variable thus represents the direction of change in the acceleration in the first phase Phase_1, which changes from $A_{int}$ to $s \times A_{target}$. Thus, the jerk in this phase has a value of $s_1 \times J_{maxi}$.

As explained with reference to the preceding example, the steps for calculating the speed profile are as follows:

The durations of the phases and the start and end times $t_0$, $t_1$, $t_2$ and $t_3$ delimiting phases Phase_1, Phase_2 and Phase_3 are calculated.

The passage speeds $V_1$ and $V_2$ corresponding to the respective passage speeds at the start and end times $t_1$ and $t_2$ delimiting the second phase Phase_2 are calculated.

By following the same procedure as in the case of the previous example regarding a decreasing speed profile and zero initial acceleration, the parameters and speeds of the profile are defined as follows:

Regarding the start and end times of the first phase Phase_1, the following notation is used:

$t_0 = 0$ (by assumption)

$t_1 = T_{01}$

With the respective durations of the first and third phases Phase_1 and Phase_3, which are stated as follows:

$$T_{01} = s_1 \times \frac{s \times A_{target} - A_{init}}{J_{maxi}}$$

$$T_{23} = \frac{A_{target}}{J_{maxi}}$$

The passage speeds of the phases are expressed as follows:

$V_0$ is the imposed initial speed of the profile, $$V_1 = V_0 + T_{01} \times A_{init} + s_1 \times J_{maxi} \times \frac{T_{01}^2}{2}$$

$$V_2 = V_3 - s \times J_{maxi} \times \frac{T_{23}^2}{2}$$

$V_3$ is the imposed target speed.

The duration $T_{12}$ of the second phase Phase_2 is defined as follows:

$$T_{12} = s \times \frac{V_2 - V_1}{A_{target}}$$

The times $t_2$ and $t_3$ delimiting the third phase Phase_3 are defined as follows:

$t_2 = T_{01} + T_{12}$ $t_3 = T_{01} + T_{12} + T_{23}$

The equation for the speed profile v(t) for each of the phases is determined as a function of the elapsed time, as follows:

Phase_1, for $0 \leq t \leq t_1$: $V(t) = V_0 + A_{init} \times t + s_1 \times J_{maxi} \times \frac{t^2}{2}$ Phase_2, for $t_1 \leq t \leq t_2$: $V(t) = V_1 + A_{target} \times s \times (t - t_1)$ Phase_3, for $t_2 <= t <= t_3$: $V(t) = V_3 + \frac{(t-t_3)^2}{2} \times (-J_{maxi} \times s)$ The distances traveled as a function of time are calculated as follows:

$X_0 = 0$ (by assumption)

$X_1 = X_0 + T_{01} \times V_0 + \frac{T_{01}^2}{2} \times A_{init} + \frac{T_{01}^3}{6} \times s_1 \times J_{maxi}$ $X_2 = X_1 + T_{12} \times V_1 + \frac{T_{12}^2}{2} \times A_{target} \times s$ $X_3 = X_2 + T_{23} \times V_3 - \frac{T_{23}^3}{6} \times J_{maxi} \times s$ The distance required to achieve the profile is $D_{profil} = X_3$.

As a variant, the jerk values set in the first and third phases of the speed profile may be different.

As a further variant, provision could be made to have different jerk values depending on whether the profile relates to an acceleration or to a deceleration.

Figure 2:
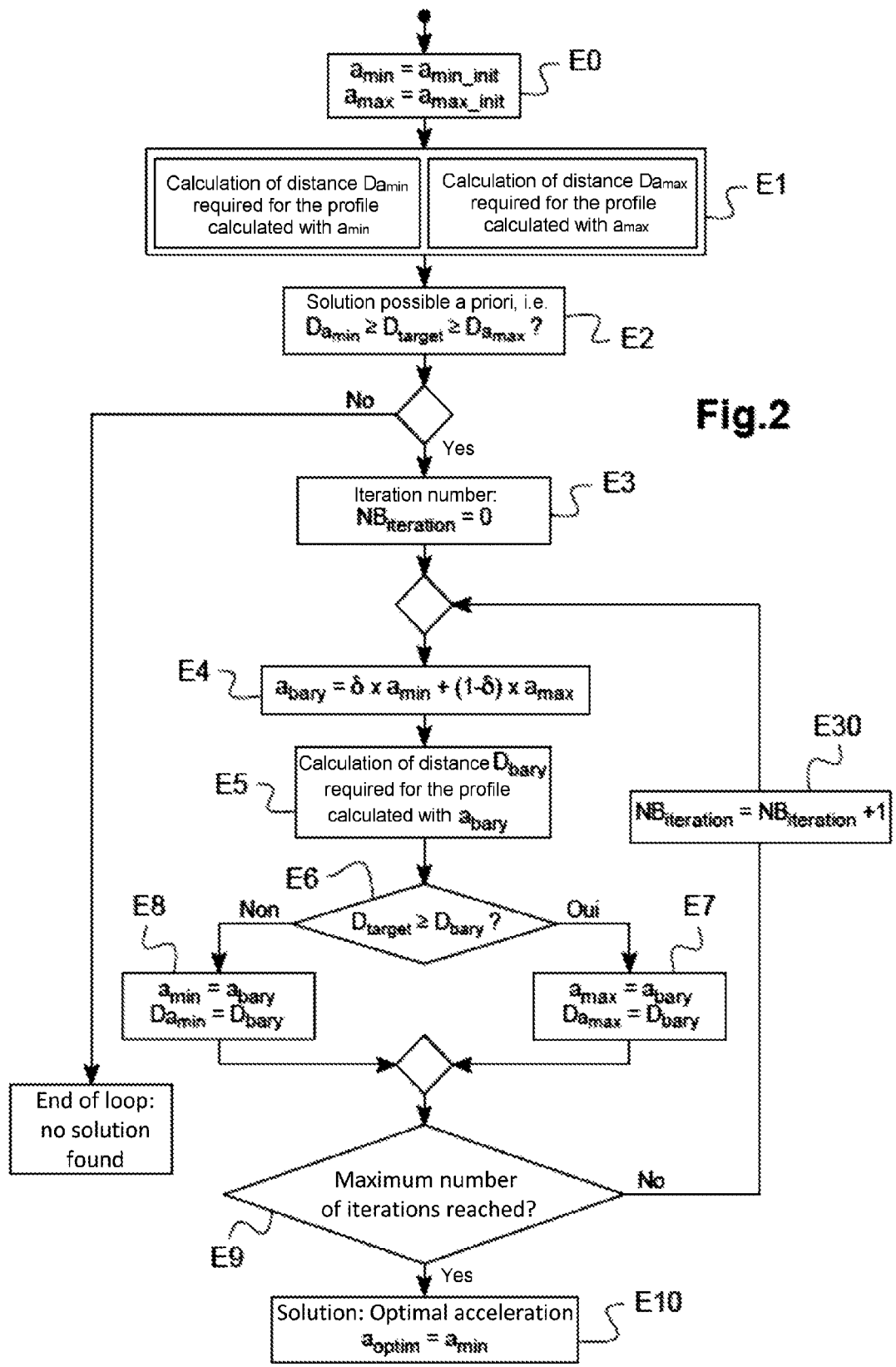
FIG. 2 is a flowchart illustrating the bisection algorithm implemented in order to determine the acceleration required in the second phase of the speed profile.

The acceleration $A_{target}$ required in the second phase Phase_2 of the profile is determined by bisection according to a bisection algorithm presented in FIG. 2. This bisection takes as a criterion the distance required to achieve the profile $D_{profil}$, which is calculated using the equations above and which should be equal to the distance from the event.

Advantageously, the speed profile is therefore generated from the following set of fixed parameters, comprising the initial speed $V_0$ of the vehicle when starting the speed profile, the speed to be reached $V_3$ at the event, the initial acceleration $A_{init}$ of the vehicle when starting the speed profile, the predetermined maximum jerk value and a non-predetermined parameter, in this case the target acceleration to be reached in the second phase of the profile $A_{target}$. According to one particular feature of the invention, this last parameter takes an optimal value determined on completion of a search by bisection, said optimal acceleration value being chosen within a bounded range, such as the distance required to achieve the profile for the set of fixed parameters, and said optimal acceleration value is equal to the distance from the event $D_{event}$.

The bisection algorithm will now be described in more detail with reference to FIG. 2. The objective is to determine the optimal acceleration value $a_{optim}$ chosen within a predetermined range that extends between a minimum acceleration value $a_{min}$ and a maximum acceleration value $a_{max}$, such that the distance required to achieve the profile is equal to the distance from the event $D_{event}$. Note that the distance required to achieve the profile decreases as the acceleration increases.

Therefore, in a first, initialization step E0, these minimum and maximum acceleration values defining the range are set, namely:

$a_{min} = a_{min\_init}$ $a_{max} = a_{max\_init}$

In a step E1 there is calculated, using the equations described above, first the distance $Da_{min}$, corresponding to the distance required to achieve the speed profile taking as the acceleration value required in the second phase of the profile the minimum acceleration value $a_{min}$ and, second, the distance $Da_{max}$, corresponding to the distance required to achieve the speed profile, taking as the acceleration value required in the second phase of the profile the maximum acceleration value $a_{max}$.

A test step E2 is then implemented, which aims to check whether it is possible to determine an optimal acceleration value. In other words, it is checked whether the distance $D_{event}$ at which the event is located is between the distances required for the profile calculated with the maximum and minimum acceleration values $a_{max}$ and $a_{min}$, respectively, namely:

$D_{a_{min}} \geq D_{event} \geq D_{a_{max}}$

If the test is failed, the algorithm ends with step E20, meaning that no acceleration value can be found to achieve the profile such that the distance required to achieve the profile is equal to the distance from the event.

Conversely, if the test is passed, then the algorithm continues with a step E3, in which a loop iteration index $NB_{iteration}$ is initialized at 0.

Next, on each iteration, in a step E4, first determined is an intermediate value $a_{bary}$ within the range bounded by the predefined minimum and maximum acceleration values, which is a barycenter of the two values with $a_{min}$ and $a_{max}$ assigned respective coefficients $\delta$ and $(1-\delta)$:

$a_{bary} = \delta \times a_{min} + (1-\delta) \times a_{max}$

Next, in a step E5, still based on the equations described above, the distance $D_{bary}$, corresponding to the distance required to achieve the speed profile is calculated, taking as the acceleration value required in the second phase of the profile the value $a_{bary}$.

The distance values $D_{bary}$ and $D_{event}$ are then compared in a step E6. If the distance from the event $D_{event}$ is greater than or equal to the distance required for the profile calculated with $a_{bary}$, then, in a step E7, the maximum acceleration value $a_{max}$ and the distance $Da_{max}$ required for the profile are set, calculated with $a_{max}$ as follows:

$a_{max} = a_{bary}$ $Da_{max} = D_{bary}$

Otherwise, in a step E8, the minimum acceleration value $a_{min}$ and the distance $Da_{min}$ required for the profile are set, calculated with $a_{min}$ as follows:

$a_{min} = a_{bary}$ $Da_{min} = D_{bary}$

It is then checked in a step E9 whether the maximum number of iterations of the loop has been reached. If not, then the loop iteration index $NB_{iteration}$ is incremented in a step E30, namely:

$NB_{iteration} = NB_{iteration} + 1$

And it loops back to step E4.

If the maximum number of iterations is reached in step E9, the algorithm provides as a result in a step E10 the optimal acceleration value $a_{optim}$ such that:

$$a_{optim}=a_{min}$$

The determination of the optimal acceleration value over the range $[a_{min\_init}, a_{max\_init}]$ is therefore a process of searching by bisection with, on each iteration, a calculation of the distance required to achieve the profile with an intermediate acceleration value, which is a barycenter of the two values $a_{min}$ and $a_{max}$ assigned respective coefficients $\delta$ and $(1-\delta)$.

Since the jerk is set at the value $J_{maxi}$, the method makes it possible to obtain the optimal acceleration $A_{target}=a_{optim} \in [a_{min\_init}, a_{max\_init}]$ such that:

$$D_{profil}(a_{optim})=D_{event}$$

In other words, this optimal acceleration value $a_{optim}$ is such that the distance required to achieve the profile, calculated with this value determined by bisection, is equal to the distance from the event.

This method for determining the optimal acceleration value in the second phase of the profile is particularly advantageous. First, the computational load required is predictable. Specifically, convergence is ensured for a fixed number of iterations. Second, it ensures good convergence. Thus, for a fixed iteration number N, and a coefficient $\delta=0.5$, the accuracy of the result $a_{optim}$ is of the order of $$\frac{a_{min} - a_{max}}{2^N}.$$

Taking a concrete exemplary application of the speed profile calculated according to the invention in the following case:

$$J_{maxi}=0.6 \; m/s^3$$

$$A_{init}=0 \; m/s^2$$

$$V_0=22.2 \; m/s=80 \; km/h$$

$$V_3=10 \; m/s=36 \; km/h$$

$$a_{min\_init}=0.5 \; m \cdot s^{-2}, a_{max\_init}=3.4 \; m \cdot s^{-2}$$

The following is obtained for $D_{event}=180$ m:

$$a_{optim}=2.1 \; m \cdot s^{-2}$$

Figure 3:
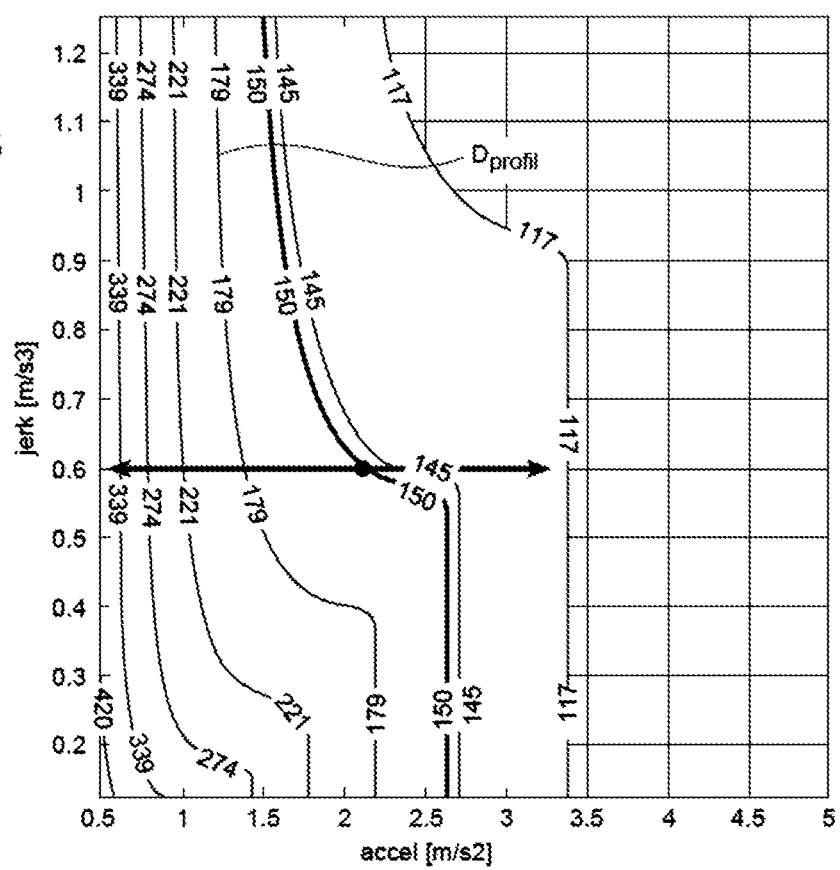
FIG. 3 is a graph illustrating the various distance values required to produce the speed profile, as a function of the jerk and acceleration values chosen for the set initial speed and target speed values.

FIG. 3 illustrates the various values taken by $D_{profil}$ as a function of the jerk and acceleration values chosen for the set values of $V_0$ and $V_3$. Here, since the value of the jerk is fixed, the sweep is therefore performed by accelerating along the arrow F.

The predetermined maximum jerk value in this case is therefore obtained by fixing at a value $J_{maxi}$ of 0.6 m/s³, but it could also have been predetermined differently, using the sweep technique. Specifically, the step of determination by bisection would then not have used an acceleration sweep along a straight line with constant y as in FIG. 3 but a sweep along an axis such as x=y for example, the jerk value $J_{maxi}$ would then have been predetermined as a function of its dependence on the acceleration and the two, optimal acceleration $A_{target}$ and jerk $J_{maxi}$ values would have been obtained in the bisection step in such a way that the distance D_profil required to achieve the three phases of said profile by applying said determined optimal target acceleration value and said jerk value is equal to said distance from the event $D_{event}$.

Figure 4:
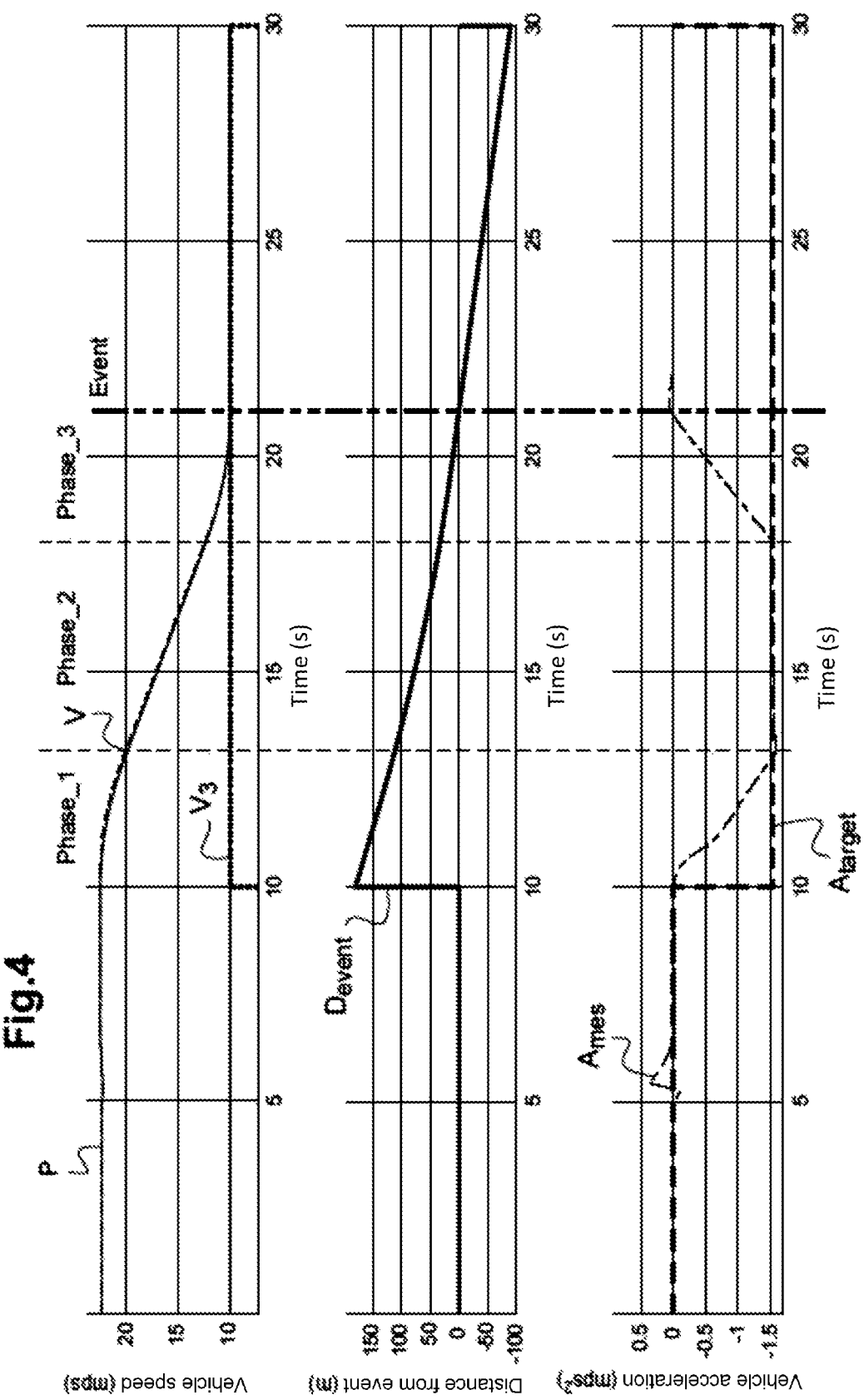
FIG. 4 is a set of graphs illustrating the speed of the vehicle according to the speed profile, distance from the event and acceleration of the vehicle.

The speed profile P in relation to these constraints, calculated according to the principles set out above, is illustrated in the first graph of FIG. 4. In the second graph of FIG. 4, the curve of the distance $D_{event}$ from the event is shown as a function of time. It may be seen in the first graph that the speed V measured for the vehicle, resulting from the following of the profile via the control law of longitudinal control for the vehicle, does indeed reach the target speed required at the event, i.e. $V_3$, when the event is reached, namely when $D_{event}=0$.

In the third graph of FIG. 4, the curve of the acceleration measured for the vehicle $A_{mes}$ is shown as a function of time. It may be seen that the acceleration of the vehicle is limited to 1.6 m/s², which is much lower than the limit defined in the calculation constraints ($a_{max\_init}=3.4 \; m \cdot s^{-2}$).

It therefore appears that the speed profile calculated according to the invention and transmitted as an instruction to the vehicle adaptive speed control system allows the vehicle to automatically reduce its speed behavior in order to gradually reach the target speed (36 km/h according to the example). This therefore makes it possible to adapt the speed of movement of the vehicle to contextual elements detected by the sensors of the vehicle. In particular, it makes it possible to reach the desired speed at the desired distance, i.e. only when reaching the event.

It has been seen above that the implementation of the speed profile requires only limited computing power, by virtue of the simple mathematical operations required. In addition, it does not require preliminary measurements on predetermined paths. In other words, it may be generalized for whenever an event ({distance, speed}) is received, by any means whatsoever.

The invention claimed is:

1. A method for determining a speed profile to be followed by a motor vehicle, the method comprising:
    acquiring contextual information on a road environment of the vehicle via a multi-sensor system of the vehicle;
    extracting event data from the acquired contextual information, comprising at least one distance from an event in relation to said vehicle and a target speed for said vehicle at the event;
    providing a measured initial speed of said vehicle;
    determining the speed profile to be followed as a function of time, between said measured initial speed and said target speed in three successive distinct phases, the three successive distinct phases including a first phase in which a jerk is set constant at a predetermined maximum jerk value in order to reach an optimal target acceleration value at an end of the first phase, a second phase in which said optimal target acceleration value is kept constant throughout a duration of the second phase, and a third phase in which the jerk is again set constant in order to reach a zero acceleration value at an end of the third phase;
    determining said optimal target acceleration value during the second phase such that the distance required to carry out the three successive distinct phases of said speed profile by applying said determined optimal target acceleration value is equal to said distance from the event, the determining of said optimal target acceleration value during the second phase is carried out through iteration and bisection from a predetermined range bounded by a minimum acceleration value and a maximum acceleration value, the minimum acceleration value being calculated from an initial acceleration value; and transmitting the speed profile as an instruction to an adaptive speed control system fitted to the vehicle, the adaptive speed control system controlling the vehicle based on the speed profile.

2. The method as claimed in claim 1, wherein the distance required to carry out the three successive distinct phases of said speed profile is calculated from a set of equations implemented for the calculation of the speed profile, a calculation of which comprises, for a set of fixed parameters comprising the initial speed and an initial acceleration of the vehicle when starting the speed profile, the target speed at the event and the predetermined maximum jerk value, and for an unfixed parameter comprising the optimal target acceleration to be reached in the second phase of the speed profile:
calculating the duration of the phases and start and end times delimiting the phases,
calculating passage speeds at the start and end times delimiting the second phase,
calculating the speed as a function of time for each of the phases, and
calculating the distances traveled at the start and end times delimiting the phases.

3. The method as claimed in claim 1, wherein, at each iteration, the distance required to produce the speed profile is calculated with an intermediate acceleration value, which is a center of gravity of the minimum and maximum acceleration values.

4. The method as claimed in claim 1, wherein, in said third phase, the jerk is set constant at said predetermined maximum jerk value of the first phase.

5. The method as claimed in claim 1, wherein, in said third phase, the jerk is set constant at a predetermined maximum jerk value different from said predetermined maximum jerk value of the first phase.

6. The method as claimed in claim 1, wherein said predetermined maximum jerk value is different depending on whether the speed profile relates to a positive acceleration or to a negative acceleration of the vehicle.

7. A device configured to be installed on board a motor vehicle, the device comprising:
circuitry configured to
acquire contextual information on a road environment of the vehicle via a multi-sensor system of the vehicle,
extract event data from the acquired contextual information, comprising at least one distance from an event in relation to the vehicle and a target speed for the vehicle at the event,
provide a measured initial speed of the vehicle,
determine a speed profile to be followed as a function of time, between the measured initial speed and the target speed in three successive distinct phases, the three successive distinct phases including a first phase in which a jerk is set constant at a predetermined maximum jerk value in order to reach an optimal target acceleration value at an end of the first phase, a second phase in which the optimal target acceleration value is kept constant throughout a duration of the second phase, and a third phase in which the jerk is again set constant in order to reach a zero acceleration value at an end of the third phase,
determine the optimal target acceleration value during the second phase such that the distance required to carry out the three successive distinct phases of the speed profile by applying the determined optimal target acceleration value is equal to the distance from the event, determining the optimal target acceleration value during the second phase being carried out through iteration and bisection from a predetermined range bounded by a minimum acceleration value and a maximum acceleration value, the minimum acceleration value being calculated from an initial acceleration value, and
transmit the speed profile as an instruction to an adaptive speed control system fitted to the vehicle, the adaptive speed control system controlling the vehicle based on the speed profile.

8. A motor vehicle, comprising:
the device as claimed in claim 7.

9. The device as claimed in claim 7, wherein the distance required to carry out the three successive distinct phases of the speed profile is calculated from a set of equations implemented for the calculation of the speed profile, a calculation of which comprises, for a set of fixed parameters comprising the initial speed and an initial acceleration of the vehicle when starting the speed profile, the target speed at the event and the predetermined maximum jerk value, and for an unfixed parameter comprising the optimal target acceleration to be reached in the second phase of the speed profile:
calculating the duration of the phases and start and end times delimiting the phases,
calculating passage speeds at the start and end times delimiting the second phase,
calculating the speed as a function of time for each of the phases, and
calculating the distances traveled at the start and end times delimiting the phases.

10. The device as claimed in claim 9, wherein, at each iteration, the distance required to produce the speed profile is calculated with an intermediate acceleration value, which is a center of gravity of the minimum and maximum acceleration values.

11. The device as claimed in claim 10, wherein, in the third phase, the jerk is set constant at the predetermined maximum jerk value of the first phase.

12. The device as claimed in claim 10, wherein, in the third phase, the jerk is set constant at a predetermined maximum jerk value different from the predetermined maximum jerk value of the first phase.

13. The device as claimed in claim 10, wherein the predetermined maximum jerk value is different depending on whether the speed profile relates to a positive acceleration or to a negative acceleration of the vehicle.

* * * * *